No. 12,579. REISSUED DEC. 18, 1906.

J. COLDWELL & C. G. GILDARD.

LOOM SHUTTLE.

APPLICATION FILED OCT. 8, 1904.

Witnesses:
Horace A. Crossman.
Everett S. Emery.

Inventors:
Joseph Coldwell.
Christopher G. Gildard
by Emery, Booth & Porell
Attys.

THE NORRIS PETERS CO., WASHINGTON, D. C.

UNITED STATES PATENT OFFICE.

JOSEPH COLDWELL AND CHRISTOPHER G. GILDARD, OF SWANSEA, MASSACHUSETTS, ASSIGNORS TO JAMES K. LANNING, OF BOSTON, MASSACHUSETTS.

LOOM-SHUTTLE.

No. 12,579. Specification of Reissued Letters Patent. Reissued Dec. 18, 1906.

Original No. 714,676, dated December 2, 1902. Application for reissue filed October 8, 1904. Serial No. 227,731.

*To all whom it may concern:*

Be it known that we, JOSEPH COLDWELL and CHRISTOPHER G. GILDARD, citizens of the United States, residing at the town of Swansea, and formerly residing at Fall River, in the county of Bristol and State of Massachusetts, have invented new and useful Improvements in Loom-Shuttles, of which the following is a specification.

Our invention relates to that class of shuttles for looms termed "hand-threading" shuttles, wherein the filling-thread is guided by the hand of the weaver into the delivery-eye of the shuttle.

The prime objects of our invention are to simplify and cheapen the shuttles of this character, to render them more positive in their threading operation, to preserve the contour of the conventional shuttle and avoid any projections or irregularities that would in any way tend to engage the warp-threads, and also provide means for efficiently retaining the threading attachment against working loose.

Other objects and advantages of the invention will hereinafter appear, and the novel features thereof will be particularly pointed out in the claims.

Figure 1:
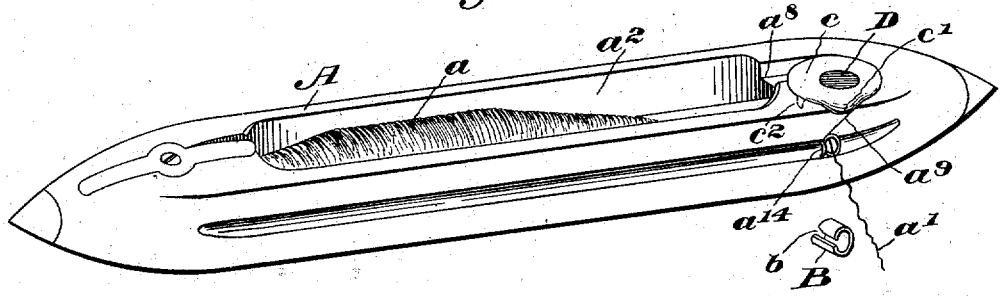
Figure 2:
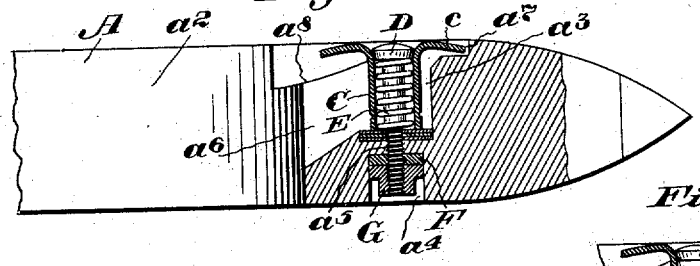
Figure 6:
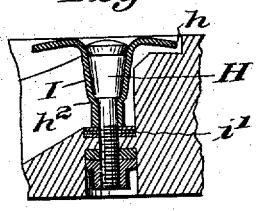
Figure 5:
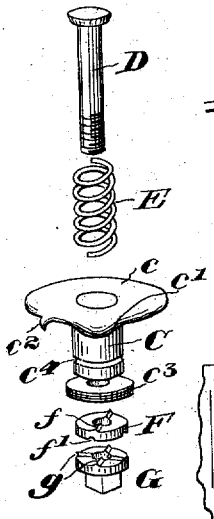
Figure 3:
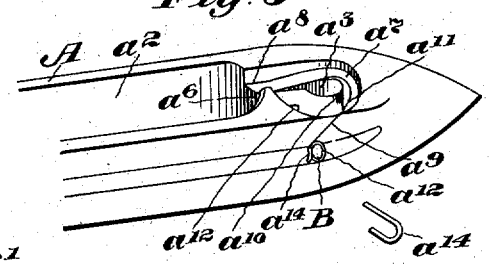
Figure 4:
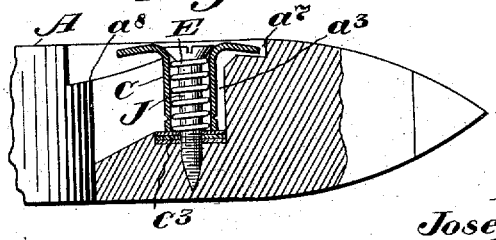

Referring to the drawings, Figure 1 is a perspective view of a hand-threading shuttle embodying our invention in its preferred form. Fig. 2 is a central longitudinal sectional view of the same. Fig. 3 is a view similar to Fig. 1 with the guide-disk removed. Fig. 4 is a view similar to Fig. 2, illustrating a modification. Fig. 5 is a detail view showing before assembling the component parts of our hand-threading attachment as employed in the construction shown in Figs. 1 and 2, and Fig. 6 is a longitudinal sectional view of another modified construction.

Similar letters of reference indicate similar parts throughout the drawings.

The shuttle-body A is of the conventional form and contains a filling $a$, from which leads the thread $a'$. At the front end of the shuttle beyond the filling-opening $a^2$ the shuttle-body is bored vertically from opposite points, thus forming upper and lower cylindrical cavities $a^3$ $a^4$, respectively, the two cavities being connected by a reduced bore or perforation $a^5$.

The upper cavity $a^3$ communicates with the filling-opening $a^2$ of the shuttle by means of a narrow throat $a^6$, the bottom of which declines, as shown, from the bottom of said upper cavity, so as not to interfere with the free travel of the thread. The remainder of the upper end of the said upper cavity is surrounded by a depressed thread-race $a^7$, the entrance to which is inclined, as at $a^8$. From a point transversely opposite the upper end of the entrance $a^8$ the thread-race beyond the entrance gradually declines and merges into an inclined guide-slot $a^9$, the same being a mere kerf, the upper end of which is tangentially disposed with regard to the cavities $a^3$ $a^4$, and which slot is disposed at an angle of about forty-five degrees. Beyond this guide-slot $a^9$ the thread-race $a^7$ is on the same horizontal plane as the said race at the upper end of the entrance $a^8$, so that immediately back of the guide-slot $a^9$ there is produced an overlapping guide-finger $a^{10}$, the inner corner of the thread-race leading to the said guide-slot being beveled away, as at $a^{11}$.

The lower end of the guide-slot $a^9$ enters the rear side of a transverse delivery-eye $a^{12}$, that extends through the wall of the upper cavity $a^3$, parallel to the said guide-slot, and therefore communicating therewith throughout the width of said slot. This delivery-eye may be provided with a bushing B, formed of metal or other material and having a longitudinal thread-entering slot $b$. The end of this bushing is of course given such shape or contour as to conform to the exterior configuration of the shuttle-body.

Seated in the upper cavity $a^3$ and somewhat smaller in diameter than the same is a hollow cylindrical post C, the upper end of which is provided with a circular or disk-shaped thread-guiding head $c$, the diameter of which is very slightly less than that of the thread-race which it occupies, so that between the perimeter of the thread-guiding disk and the wall of the thread-race an intervening narrow space occurs. The cavities $a^3$ $a^4$ are slightly to one side of the shuttle-body, so that the edge of the thread-guiding disk $c$ covers the upper end of the inclined thread-guide $a^9$, immediately above which the said disk is slightly depressed, as at $c'$, to conform to the exterior formation of the shuttle-body. If desired, the edge of the thread-guiding disk may have a depending spur $c^2$, which, engaging with an aperture $a^{12}$, formed in the bottom of the thread-race of the shuttle-body, will immediately properly adjust the said disk when applied to the said shuttle, such spur of course being located back of the guide-slot $a^9$, so as not to interfere with the introduction of the thread, as will hereinafter appear.

For the purpose of elevating the thread-guiding disk a suitable distance above the bottom of the thread-race recourse may be had to one or more thin washers $c^3$, the same being of somewhat greater diameter than the hollow cylindrical post C and fitting the upper cavity $a^3$, upon the bottom of which they rest. Immediately above its lower end the post C may be provided with an annular thread-groove $c^4$.

In the constructions illustrated in Figs. 1 to 5, inclusive, the foregoing description for the most part equally applies, the differences being merely in the manner of securing the bolt or screw, hereinafter referred to, in position.

In the preferred form (see Figs. 1, 2, 3, and 5) a bolt D is employed, the upper end or head of the same being countersunken in the guide-disk and the lower end extending through the washers $c^3$ and perforation $a^5$ into the lower cavity $a^4$. A coiled spring E encircles the bolt, which latter is of less diameter than the hollow post and is compressed between the head of the bolt and the washers $c^3$, thereby exerting an upward pressure upon the bolt.

Within the cavity $a^4$ of the shuttle-body may be located simply an ordinary nut threaded on the lower end of the bolt, or the same may be provided with any form of nut-lock, it being essential that the parts be prevented from working loose, as will be readily appreciated. We prefer, however, to employ in the lower cavity $a^4$ a washer F, upon the upper face of which is formed one or more ribs $f$ and the under side of which is provided with radial grooves $f'$. Below the washer we employ a flanged nut G, the upper face of which is provided with radial ribs $g$, corresponding in number and location with the grooves in the washers. By tightening up the nut by an ordinary socket key-wrench the ribs $f$ of the washer will be forced into the fiber of the wood of the shuttle-body, and the ribs of the nut will, by reason of the presence of the spring E, yieldingly engage with the grooves $f'$ of the washer, and thus the guide-disk is yieldingly held in its depressed position and the nut locked by one and the same spring. This completes the construction with the exception of the deflecting-staple $a^{14}$, that spans the lower end of the guide-slots $a^9$ of the shuttle and that of the bushing in the delivery-eye.

In operation as the shuttle is held stationary in one hand, the thread is guided by the other hand into the thread-race, beneath the guiding-disk $c$ and about the latter until it reaches the point $a^7$, by which and the incline $a^{11}$ it is caused to descend the incline-slot $a^9$, at the bottom of which by the staple $a^{14}$ it is deflected into the delivery-eye, the entire operation being continuous, immediate, and positive.

The staple $a^{14}$ extends over in line with the eye opposite the slot in the bushing, and the thread is prevented from leaving the eye laterally and is obviously precluded from dethreading or entangling entrance into the exteriorly-exposed portions of the thread entering slot $b$ or the guide-slot $a^9$.

In the construction illustrated in Fig. 4 the operation is the same. The construction, however, slightly differs. In this arrangement the bottom cavity is omitted and only the upper cavity $a^3$ employed. The hollow post C is seated, as before, in the cavity $a^3$ and rests upon the washers $c^3$. In lieu of the bolt D we employ an ordinary screw J, which is forced upward by the expanding action of the coiled spring E, whereby the threads of the screw are drawn up against the fiber in the wood of the shuttle-body and the screw therefore placed under a tension that prevents it from accidentally turning when once set.

In Fig. 6 the spring is entirely omitted and an ordinary nut employed within the lower cavity $a^4$ upon the lower end of a bolt H. In this instance the lower end of the hollow post I may rest upon a series of washers $i'$, which sufficiently elevates the thread-guide disk $h$ above the thread-race of the shuttle-body, said thread-race and guide-disk being the same as heretofore described. The bolt H may be reduced at an intermediate point, thus producing an annular shoulder $h^2$, and the hollow post is similarly proportioned and shaped, so as to conform to the bolt, as plainly shown. For the reasons stated, however, we prefer to employ the spring and other accessories incidental to the locking-nut, though, as will be obvious, any other form of nut-lock may be substituted. The spring, as herein employed in Figs. 1, 2, and 5, however, it will be observed, performs a double function—namely, it tends to draw the bolt upward, so that its threads impinge at their upper faces against the engaging threads of the nut and shuttle-body, and also to yieldingly engage the ribs of the nut with the corresponding grooves of the nut engaging and locking washer.

We claim—

1. A shuttle having beyond its opening a cavity; a surrounding thread-race; a communicating throat; a lateral eye; and an inclined slot leading from said thread-race to said eye; combined with a hollow post seated in the cavity, and provided at its upper end with a guide-disk supported above the thread-race; a bolt located in the hollow post; and a coiled spring encircling the bolt and compressed between the head of the same and the bottom of the cavity.

2. A shuttle having beyond its opening a cavity; a surrounding thread-race; a communicating throat; a lateral eye; and an inclined slot leading from said thread-race to said eye; combined with a hollow post seated in the cavity, and provided at its upper end with a guide-disk supported above the thread-race; a plurality of washers seated in the cavity below the post; and a bolt located in the post and shuttle-body and passing through the washers.

3. A shuttle, provided with a discharge-eye and a thread-race communicating therewith; combined with a guide-disk; a bolt depending therethrough to the opposite side of the shuttle-body; a spring encircling the bolt and exerting an upward tendency of the same; a toothed washer arranged on the lower end of bolt and provided on its under side with grooves; and a nut on the bolt below the washer and provided with ribs for engaging yieldingly with the grooves thereof.

4. A shuttle provided beyond its filling-opening in its upper side with a cavity; a communicating throat; a surrounding thread-race, a lateral thread-discharging eye; and an inclined slot leading from the race to the eye; combined with a hollow post seated in the bottom and of less diameter than the cavity and terminating at its upper end in an enlarged or flared thread-guiding disk supported above and conforming to the thread-race; a fastening-bolt seated in the post and the shuttle; and a coiled spring encircling the bolt within the post and compressed between the head of the bolt and the bottom of the cavity.

5. A shuttle provided beyond its filling-opening with upper and lower alining and communicating cavity; a throat leading to the upper cavity; a surrounding thread-guide; a lateral thread-discharging eye; and an inclined guide-slot leading from the thread-race to the eye; combined with a hollow post seated in said upper cavity; a guide-disk supported above the race by said post; a bolt passed through the post and depending into said lower cavity; a washer grooved on its under side and ribbed on its upper side and located on the bolt within the lower cavity; a nut ribbed on its upper side to engage the grooves of the washer and also located in the lower cavity; and a spring for normally elevating the bolt, washer and nut.

6. A shuttle provided beyond its filling-opening with upper and lower alining cavities; a throat leading to the upper cavity; a surrounding thread-guide; a lateral thread-discharging eye; and an inclined guide-slot leading from the thread-race to the eye; combined with a hollow post seated in said upper cavity; a guide-disk supported above the race by said post; a bolt passed through the post and depending into said lower cavity, a washer grooved on its under side and ribbed on its upper side and located on the bolt within the lower cavity; a nut ribbed on its upper side to engage the grooves of the washer and also located in the lower cavity; and a coiled spring encircling said bolt and compressed between the head thereof and bottom of the upper cavity and inclosed by the hollow post.

7. A shuttle provided beyond its filling-opening with a cavity $a^3$; a communicating throat, $a^6$; a surrounding thread-race, $a^7$, cut away as at $a^8$ and $a^{11}$, and provided with a finger or horn, $a^{10}$; the eye, $a^{12}$; provided with the slotted bushing $a^{13}$; the guide-slot, $a^9$, leading from the race to the eye; combined with the hollow post seated in the cavity and the guide-disk, $c$, conforming to and supported above the cavity; and a fastening device passing through said hollow post.

8. A shuttle provided beyond the filling-opening with a cavity, $a^3$; a communicating throat, $a^6$; a surrounding thread-race, $a^7$, cut away as at $a^8$ and $a^{11}$ and provided with the finger or horn, $a^{10}$; the eye, $a^{13}$; provided with the slotted bushing, B; the guide-slot, $a^9$, leading from the race to the eye; combined with the hollow post seated in the cavity and the guide-disk, $c$, conforming to and supported above the cavity; the deflecting-staple, $a^{14}$, straddling the inclined slot; and a fastening device passing through said hollow post.

9. A shuttle provided beyond its filling-opening with a cavity; a throat leading from the filling-opening to the cavity; a discharge-eye communicating with the cavity and a slot leading from the upper side of the shuttle to the discharge-eye; combined with a U-shaped deflecting-staple straddling the slot at its point of communication with the discharge-eye; a post secured in the cavity; and a guide-disk supported by the post and adapted at its perimeter to guide thread to said inclined slot.

10. A shuttle provided beyond its filling-opening with a cavity, a communicating throat, a lateral discharge-eye communicating with the cavity, and an inclined slot leading from the upper side of the said cavity to the said lateral discharge-eye, combined with a thread-guide supported in the cavity, a longitudinally-slotted bushing seated in the discharge-eye, and a U-shaped staple located at one side of the said lateral discharge-eye and extending over in line with the eye opposite the slot in the bushing, whereby the thread is prevented from leaving the eye laterally.

11. A shuttle provided with a transverse delivery-eye, a thread-guide in said eye provided with an open thread-entering passage, a guide-slot in the shuttle-walls leading to said eye and about the outer walls of said guide to said thread-entering passage, and deflecting guard means, other than said thread-guide, acting to deflect the thread from said guide-slot into said eye and to guard the exteriorly-exposed mouth of said passage from dethreading entrance of the thread.

12 A shuttle provided with a transverse delivery-eye, a thread-guide in said eye having an open thread-entering slot, and means, other than said thread-guide, to guard the exteriorly-exposed mouth of said slot from dethreading entrance of the thread.

13. A shuttle provided with a delivery-eye, having a bushing therein, the latter having a thread-entering passage and means to retain said bushing and guard the exteriorly-exposed mouth of said passage from dethreading entrance of the thread.

14. The combination with a shuttle-body provided with a spindle-recess, a threading-recess forward of the spindle-recess, a threading-notch connecting said recesses, a delivery-eye connecting with said threading-recess, a bushing for said eye provided with a longitudinal opening, a threading-slit leading to the opening in the said bushing and a bar disposed adjacent the delivery-eye for retaining said bushing and preventing the escape of the thread from the delivery-eye, substantially as described.

15. The combination with a shuttle having a threading-eye of a bushing located in said threading-eye, threading-passages permitting the thread to be drawn into the threading-eye and bushing, and means retaining the bushing in place and preventing the escape of the thread from the eye and bushing, substantially as described.

16. The combination with a shuttle-body provided with a spindle-recess, a threading-recess forward of the spindle-recess, a threading-notch connecting said recesses, a delivery-eye connecting with said threading-recess, a bushing for said eye provided with a longitudinal opening, a threading-slit leading to the opening in the said bushing, a bar mounted in the side wall of the shuttle adjacent the delivery-eye and located to intersect the path of outward axial movement of said bushing.

17. The combination with a shuttle having a threading-eye of a bushing located in said threading-eye, threading-passages permitting the thread to be drawn into the threading-eye and bushing and a bar mounted in the side wall of the shuttle adjacent the delivery-eye and located to intersect the path of outward axial movement of said bushing.

18. The combination with a shuttle having a delivery-eye, of a bushing located in said delivery-eye, threading-passages permitting the thread to be drawn into the delivery-eye and bushing, and a bar disposed adjacent the delivery-eye and communicating threading-passage to prevent the escape of the thread from the eye and bushing.

In testimony whereof we affix our signatures in presence of two witnesses.

JOSEPH COLDWELL.
CHRISTOPHER G. GILDARD.

Witnesses:
NICHOLAS HATHEWAY, JR.,
JOHN W. HURST.